E. L. FICKETT AND V. CHARUSHIN.
TOOL HOLDER.
APPLICATION FILED SEPT. 30, 1920.

1,391,375.

Patented Sept. 20, 1921.
2 SHEETS—SHEET 1.

Inventors
Ernest L. Fickett
Vladimir Charushin
by Roberts, Roberts & Cushman
their Attorneys

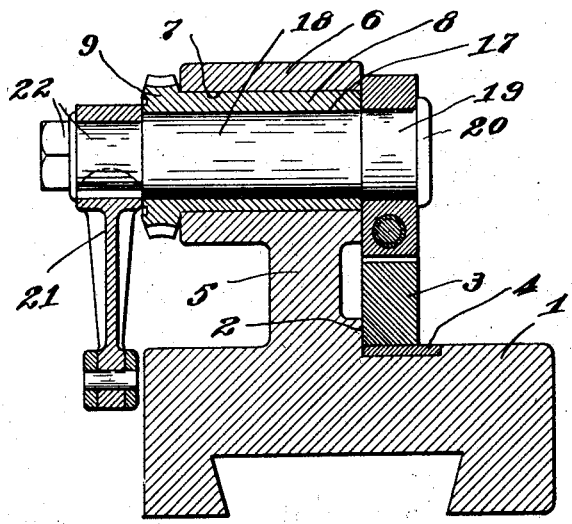
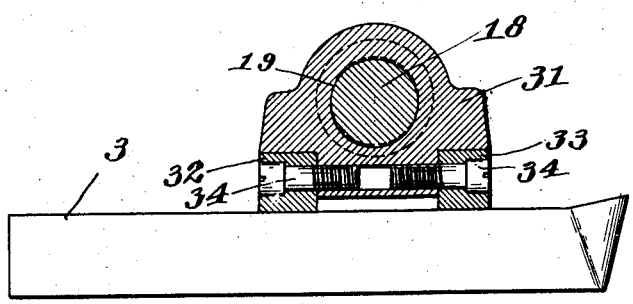

UNITED STATES PATENT OFFICE.

ERNEST L. FICKETT AND VLADIMIR CHARUSHIN, OF FITCHBURG, MASSACHUSETTS, ASSIGNORS TO MANNING, MAXWELL & MOORE, INC., OF NEW YORK, N. Y., A CORPORATION OF NEW JERSEY.

TOOL-HOLDER.

1,391,375.  Specification of Letters Patent.  Patented Sept. 20, 1921.

Application filed September 30, 1920. Serial No. 413,722.

*To all whom it may concern:*

Be it known that we, ERNEST L. FICKETT and VLADIMIR CHARUSHIN, citizens of the United States of America, and both residents of Fitchburg, in the county of Worcester and State of Massachusetts, have invented new and useful Improvements in Tool-Holders, of which the following is a specification.

This invention relates to tool holders adapted for employment in connection with machine tools and more particularly to such tool holders intended for use in machining heavy work such for example as steel tires of large diameter.

In devices of this type it is necessary to support the tool against very heavy and long continued stresses, and to avoid chattering of the tool with consequent damage to the piece being machined, the tool must be held by means of appliances capable of exerting a heavy and continuous pressure thereon. An object of the present invention is to provide a tool holder in which the tool may be held firmly and rigidly while in operative position, and which at the same time will be simple in construction and litte subject to wear or damage in use.

To this end the tool holder may be provided with a seat for the tool and with a movable clamping element opposed to such seat, such clamping element being movable toward such seat by means of a cam or eccentric arranged for power actuation. This eccentric may if desired be formed upon a rotatable shaft provided with a crank or equivalent means whereby it may be turned. As a suitable and convenient means for turning the shaft, a power cylinder may be directly mounted upon the tool holder carriage and having a piston therein connected to the crank upon the shaft whereby admission of fluid to the cylinder will rock the crank and thereby turn the arm.

In devices of the character above described, and in which the tool is clamped in position while in operation, it is found that the heavy operative pressures to which the tool is subjected frequently cause the tool or the movable parts of the clamp whereby it is held to become so wedged that it is difficult to remove the tool from the clamp when for any reason it is desirable to do so. A further object of the present invention is to provide operative means for the clamping device capable of exerting a force for opening the clamp somewhat in excess of the force employed for closing it, thus insuring ready opening of the clamp under all conditions. For this purpose, when a power cylinder is employed as the actuating agency, it is usually sufficient to so connect the clamp actuating arm to the piston rod that the rod end of the piston shall be operative for closing the clamp and the head end of the piston will serve as the pressure receiving element in opening the clamp. The difference in area of the two sides of the piston head when thus connected serves to provide the necessary difference in force applicable for opening and closing the clamp, it being contemplated however that when such cylinder and piston are not employed as the clamp actuating device, other mechanical means capable of exerting opening and closing pressures at the clamp of different relative magnitudes may be made use of in carrying into effect the object stated.

As in certain classes of work it is necessary to change the tool frequently, it is desirable to provide for the rapid setting and release of the tool relative to the tool holder prior to the relatively slow movement of the power actuated operating means. A further object of the present invention is to provide for the rapid manual opening and closing of the clamping means which shall not interfere in any way with the operation of the power actuated means and which at the same time will not be affected by the movements of the latter. To this end the shaft above mentioned and which carries the clamp operating eccentric and the piston actuated crank may be journaled in an eccentric bore in a rotatable sleeve, and manually operable means, such as a worm meshing with a worm wheel upon the sleeve may be employed for turning the sleeve. In such an arrangement the pitch of the worm and wheel will be so selected as to prevent any rotation of the worm shaft by reason of the application of turning force to the sleeve carrying the worm wheel or to the shaft journaled therein. The worm shaft may have applied thereto a hand wheel or equivalent device for the ready manual operation thereof.

As the tools employed in tool holders of this type do not always have plane surfaces for the clamping jaws to engage against it is at times difficult to secure a proper holding of the tool even when considerable pressure is exerted at the clamping jaws. A further object of the invention is to provide a movable clamping jaw capable of accommodating itself to slight irregularities in the tool surface whereby to secure a firm grip upon the same. One mode of accomplishing the desired result may consist in the provision of a clamping jaw journaled upon the eccentric end of the power shaft above mentioned and having a pair of tool engaging shoes spaced apart and pivoted to swing independently in planes substantially parallel to the shaft. With this arrangement the swinging of the jaw and shoes in planes at right angles one to the other provides what amounts to a universal joint for the tool engaging elements, thus permitting them to contact closely with the tool surface even though the latter be somewhat inclined or irregular.

A preferred embodiment of the invention whereby to carry out the above objects is illustrated in the accompanying drawings in which—

Fig. 3 is a cross section longitudinally of the clamp operating shaft; and

Fig. 4 is a longitudinal cross section through the movable clamping jaw.

Figure 1:
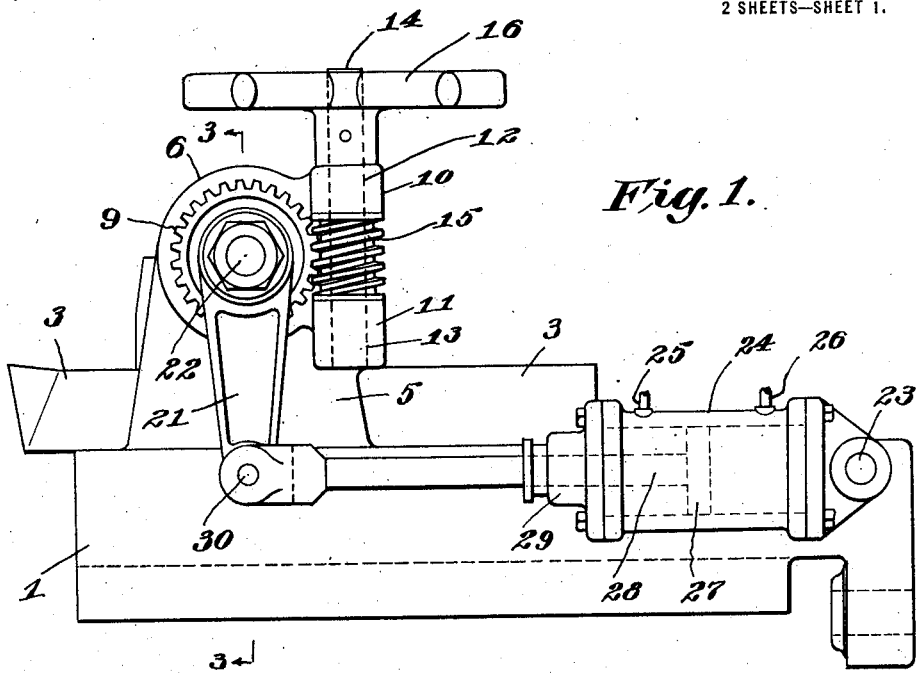
Figure 1 is a side elevation of the complete device at the opposite side from that at which the clamping jaws are located.
Figure 2:
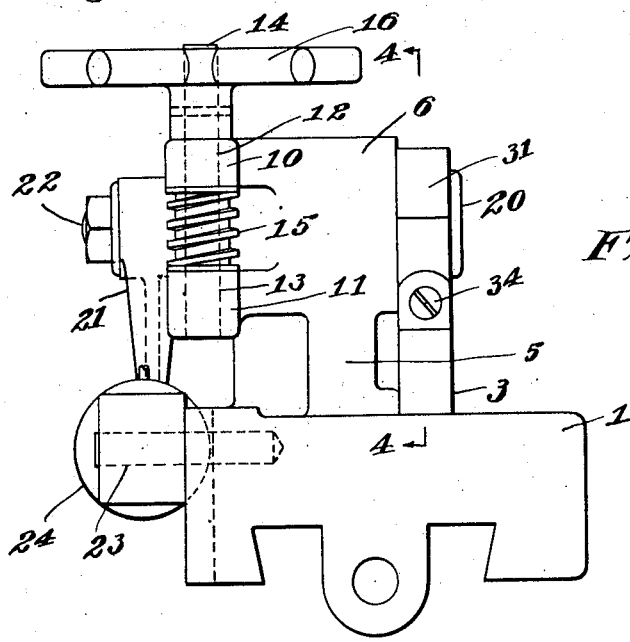
Fig. 2 is a rear end elevation of the device.

1 is a support which may be the ordinary cross carriage employed in lathes and upon which the tool is supported. This carriage or support is provided with a substantially vertical surface 2, against which the tool 3 may be placed, and is provided with a hardened fixed jaw 4 upon which the tool may rest. This jaw, if desired, may be integral with the support 1 but is preferably formed of some material such as tool steel which may be hardened and attached in any suitable manner to the support. Upstanding from the support is a bracket 5, having a boss 6 in which is formed a journal opening 7 for a sleeve 8 which is freely turnable therein. The sleeve 8 projects at one end beyond the boss 6 and is there provided with a worm wheel 9 which may be formed integral with said sleeve or secured thereto in any desired manner.

Projecting laterally from the boss 6 are a pair of lugs 10, 11 spaced apart and having formed therein alined openings 12, 13 in which is journaled a substantially vertical shaft 14. At a point between the lugs 10 and 11 a worm 15 is secured to the shaft 14, such worm meshing with the worm wheel 9. Secured at the upper end of the shaft 14 is a hand wheel 16 or other suitable device whereby the shaft 14 may be rotated manually. Rotation of the hand wheel 16 thus serves to turn the sleeve 8 in the journal opening 7. The pitch of the worm wheel is so determined that while actuation of the wheel by turning of the worm is freely permitted there is no possibility of turning the shaft 14 by the application of a turning force to the sleeve 8.

The sleeve 8 is provided with an eccentric bore 17 extending longitudinally thereof and in said bore is journaled a shaft 18 such shaft projecting at both ends beyond said sleeve. At its right hand portion where it extends beyond the sleeve shaft 18 is provided with a fixed eccentric 19 which may be formed integrally with the shaft or otherwise as desired. Beyond the eccentric the shaft is provided with an enlarged head 20 for a purpose hereinafter described, it being noted, however, that the eccentric lies directly above the fixed jaw 4. The shaft 18 at its opposite end has keyed thereto a crank arm 21 held in position thereon by means of a suitable nut 22.

At the point 23 on the support 1 is pivoted a power cylinder 24 having fluid inlets 25, 26 at opposite ends thereof. 27 is a piston slidable within the internal bore of said cylinder, said piston having secured to one face thereof a piston rod 28 passing out through the stuffing box 29 at one end of the cylinder. The piston rod 28 at its opposite end is connected by a crank pin 30 to the extremity of the crank arm 21.

Mounted upon the eccentric 19 is the movable clamping jaw 31, such jaw being journaled to turn freely upon the eccentric 19 and being held in position thereon by the head 20. The clamping jaw 31 is arranged to extend longitudinally of the tool 3 and above the same, and is provided at its lower portion with seats for the reception of a pair of tool engaging shoes 32, 33, respectively, which are pivotedly secured to the jaw 31 by means of the shoulder screws 34, 35 or other suitable means. The jaws 32, 33 are preferably spaced apart, and as clearly seen in Fig. 4, such shoes are arranged to turn in planes substantially parallel to the axis of the shaft 18 while the jaw 31 is supported to swing in a plane at right angles to such axis.

In the operation of the device the hand wheel 16 will be turned by the operator thereby rapidly rotating the sleeve 8 and by reason of the eccentric mounting of the shaft 18 therein the latter will be moved bodily upward while maintaining its axis substantially parallel to its original position. Such movement of the shaft 18 lifts the movable jaw 31 rapidly away from the tool permitting the ready removal of the latter and the insertion of a new tool beneath the shoes 32, 33. The operator now reverses the movement of the hand wheel 16 whereby to turn the sleeve 8, moving the shaft 18 downwardly and bringing the shoes 32, 33 into contact with the upper surface of the tool. As the shoes 32, 33 are free to rock independently transversely of the tool and as the jaw 31 is free to rock longitudinally of the tool it is clear that small irregularities in the surface of the tool will be readily compensated and the jaw 31 will be enabled to obtain a firm grip upon the tool.

Power fluid is now permitted to flow through the pipe 25 into the rod end of the cylinder 24 thereby causing the piston to travel toward the head end of the cylinder. This movement of the piston serves through the piston rod 28 and crank arm 21 to rock the shaft 18 within the sleeve 8. This rocking of the shaft serves, by reason of the proper relative arrangement of the crank arm 21 and the eccentric 19, to further depress the clamping jaw 31. The eccentricity of the eccentric 19 is, however, very small as compared with the eccentricity of the bore 17, and while the latter serves to permit a coarse adjustment of the clamping jaw 31 manually, the eccentric 19 provides a very slight adjustment of the clamping jaw 31 but under full pressure of the fluid in the cylinder 24. This arrangement permits the application of extremely heavy pressure to the clamping jaw 31 whereby the tool is very firmly held in operative position. When it is desired now to release the tool, pressure is admitted to the head end of the cylinder through the pipe 26, the fluid being simultaneously released from the rod end of the cylinder. As the head end of the piston presents a somewhat larger area to the action of the pressure fluid than does the rod end thereof, it is evident that a greater force is available for moving the crank arm 21 and the shaft 18 in the opposite direction and thus all difficulty in releasing the pressure upon the tool due to cramping of the same in operation is overcome. As soon as the shaft 18 has been rocked to release the heavy pressure of the jaw 31, hand wheel 16 may be turned manually for raising the clamp as above described.

While a preferred arrangement of the device has been shown and described herein, it is to be understood that various changes and modifications in the same within the skill of the ordinary mechanic may be made, and equivalents for the various elements thereof substituted without departing from the spirit and scope of the present invention.

We claim:

1. In a tool holder, in combination a fixed jaw, a bodily movable jaw coöperating therewith, cam means for moving said latter jaw bodily toward the fixed jaw, a shaft for supporting said cam means and power means for rocking said shaft.

2. In combination in a tool holder, a support, a fixed clamping jaw therein, a shaft journaled to turn relatively to said support, a cam carried by said shaft, a movable jaw suspended from said cam and actuable thereby, and power means mounted upon said support for turning said shaft.

3. In a tool holder in combination a fixed jaw, a jaw movable toward and from said fixed jaw, a rockable shaft, an eccentric cam upon said shaft for actuating said movable jaw, said eccentric constituting the sole support for said movable jaw, a crank upon said shaft, and means for moving said crank.

4. In combination in a device of the class described, a support, a shaft mounted therein, an eccentric upon said shaft, a jaw having a bearing opening for the reception of said eccentric, a crank arm fixed too said shaft, a power cylinder pivotally mounted upon said support, a piston in said cylinder and a piston rod directly connected to said crank arm.

5. In a device for holding a tool, in combination a support, a shaft mounted to turn therein, a jaw actuating eccentric upon said shaft, a jaw suspended from said eccentric, a power cylinder having a piston therein mounted upon said support, and connections between said piston and said shaft whereby movement of the piston serves to actuate the shaft.

6. In combination a movable tool clamping member, connections for moving said member toward and from clamping position, said connections comprising a reciprocable element, and means for applying greater force to said element for moving said member from clamping position than for moving it toward clamping position.

7. In a device of the class described, in combination, a movable tool clamping jaw, connections for moving said jaw toward and from clamping position, said connections including a reciprocable rod, a power cylinder having closed ends, a piston therein having said rod secured to one side thereof, and means for admitting fluid under pressure alternately to the ends of said cylinder, such fluid when admitted to the rod end of the cylinder serving to actuate the parts for bringing said jaw into clamping position.

8. In a tool holding device, in combination, a support, a shaft mounted therein, a movable clamping jaw operatively connected to said shaft, a power cylinder having closed ends, a piston and piston rod reciprocable therein, and operative connections between said rod and said shaft, the parts being constructed and arranged whereby pressure applied to the rod end of said piston serves to move said jaw to clamping position.

9. A tool holder having in combination a support, a rockable shaft therein, a movable clamping jaw operatively connected with said shaft, a crank arm fast to said shaft, a power cylinder rockably mounted on said support, a piston in said cylinder, and a piston rod secured at one end to said piston and at the other end to said crank arm, the arrangement of parts being such that pressure fluid admitted to the head end of the cylinder serves to move said clamping jaw away from clamping position.

10. In a tool holder, a movable clamping jaw, power means for moving said jaw bodily, and manually actuable means for moving said jaw.

11. In a device of the class described, a movable clamping jaw, fluid operated means for moving said jaw bodily, and manually operable means for moving said jaw bodily.

12. In a tool holder, a movable clamping jaw, manually operable means for opening and closing said jaw rapidly and positively, and power actuated means for moving said jaw slowly and with relatively great force.

13. In a device of the class described in combination a movable clamping member, power means for moving said member and manually actuable means for moving said member, said latter means comprising a worm and worm-wheel.

14. In a tool holder, a shaft, a clamping device operatively connected thereto, a sleeve having an eccentric journal for said shaft, means for turning the shaft and means for turning the sleeve.

15. A tool holder comprising a support, a sleeve having an eccentric bore mounted to turn in said support, a shaft rockably journaled in said bore, a clamping member operatively connected to said shaft, means for rocking said shaft, a worm wheel fast to said sleeve, and a manually operable worm engaging said worm wheel.

16. In a device of the class described, a support, a sleeve having an eccentric bore mounted to turn in said support, a shaft turnable in said sleeve, said shaft having an eccentric adjacent one extremity thereof and a crank fast to its opposite extremity, a clamping jaw journaled upon said eccentric, a fluid actuated piston connected to said crank, a worm wheel fast to said sleeve, an adjusting shaft journaled in said support, a worm fast to said shaft and engaging said wheel and a hand wheel fixed to said last named shaft for turning the same.

17. In a tool holding device in combination a movable clamping element, a shaft operatively connected to said element, power means for turning said shaft, and manually operable means for imparting bodily movement to said shaft.

18. In combination in a tool holder, a shaft, a clamping jaw operatively connected to said shaft, means for rocking said shaft, and means for moving said shaft whereby to vary the position of its axis.

19. A tool holder having in combination a rockable shaft, an eccentric fixed to said shaft, and a movable clamping jaw journaled upon said eccentric.

20. A tool holder comprising in combination a clamping jaw, pivotal means for supporting said jaw, and a pair of tool engaging shoes movably secured to said jaw in spaced apart relation.

21. In a tool holder, a clamping jaw arranged to extend longitudinally of the tool, and a pair of tool engaging shoes pivotally secured to said jaw in spaced relation lengthwise thereof.

22. A tool holder comprising in combination a clamping jaw pivoted to swing substantially in the plane of the axis of the tool to be clamped, and a tool engaging shoe pivotally secured to said jaw to swing in a plane substantially at right angles to the swing of the latter.

23. A tool holder comprising in combination a clamping jaw, means for pivotally supporting said jaw, and a plurality of independently mounted tool engaging shoes secured to said jaw to swing in a direction substantially at right angles to the pivotal movement of the jaw.

24. In combination in a tool holder, a shaft having an eccentric thereon, a clamping jaw journaled on said eccentric, a pair of tool engaging shoes spaced longitudinally of said jaws, and independent pivot means for securing said shoes to the jaw whereby said shoes are permitted to swing in planes substantially parallel to the axis of said shaft.

Signed by us at Fitchburg, Massachusetts, this 24th day of September, 1920.

ERNEST L. FICKETT.
VLADIMIR CHARUSHIN.